May 18, 1937. F. KRUEGER 2,081,042
CAN BEADER
Filed July 18, 1935 3 Sheets-Sheet 1
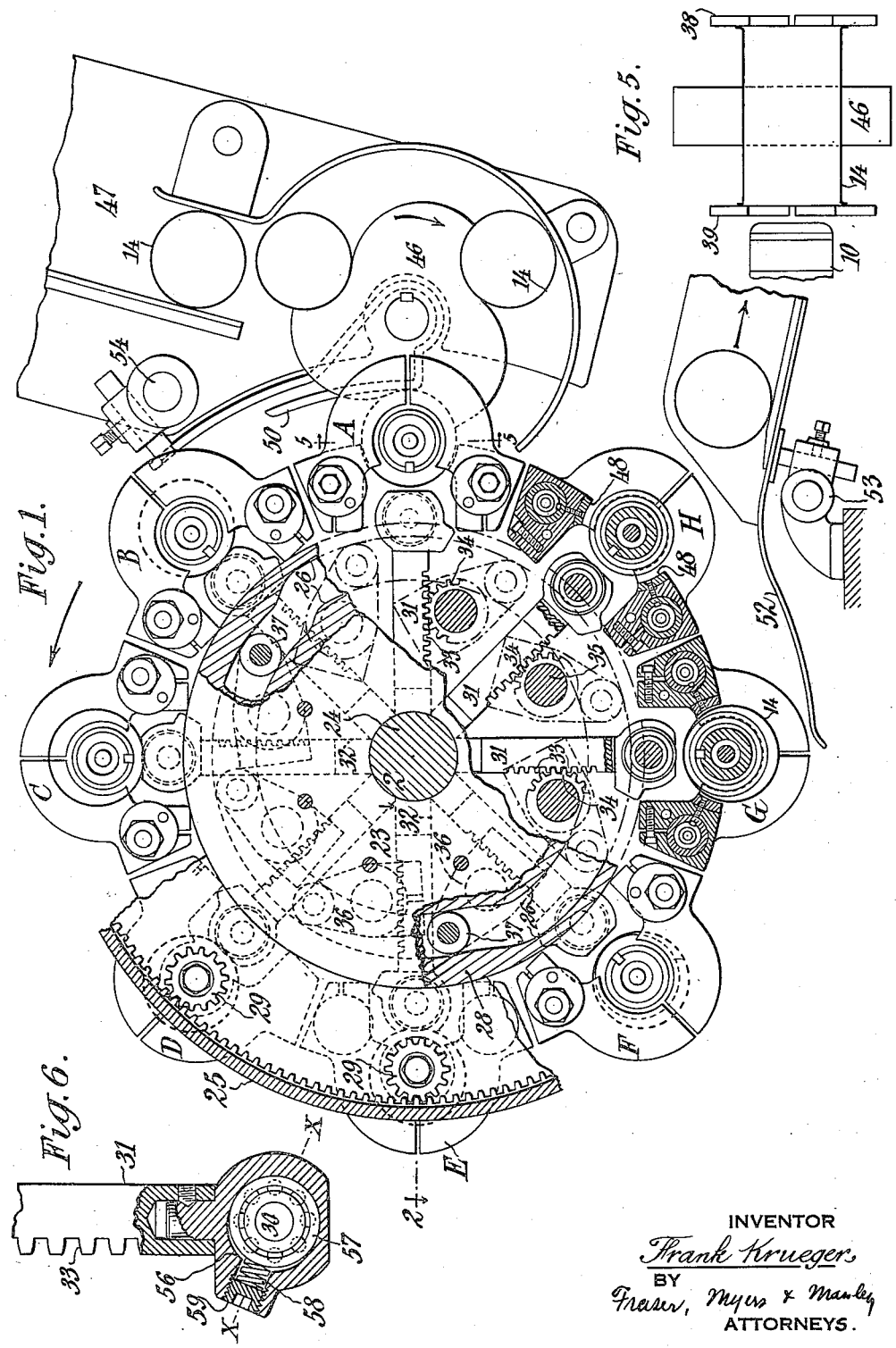
INVENTOR
Frank Krueger
BY
Fraser, Myers & Manley
ATTORNEYS.

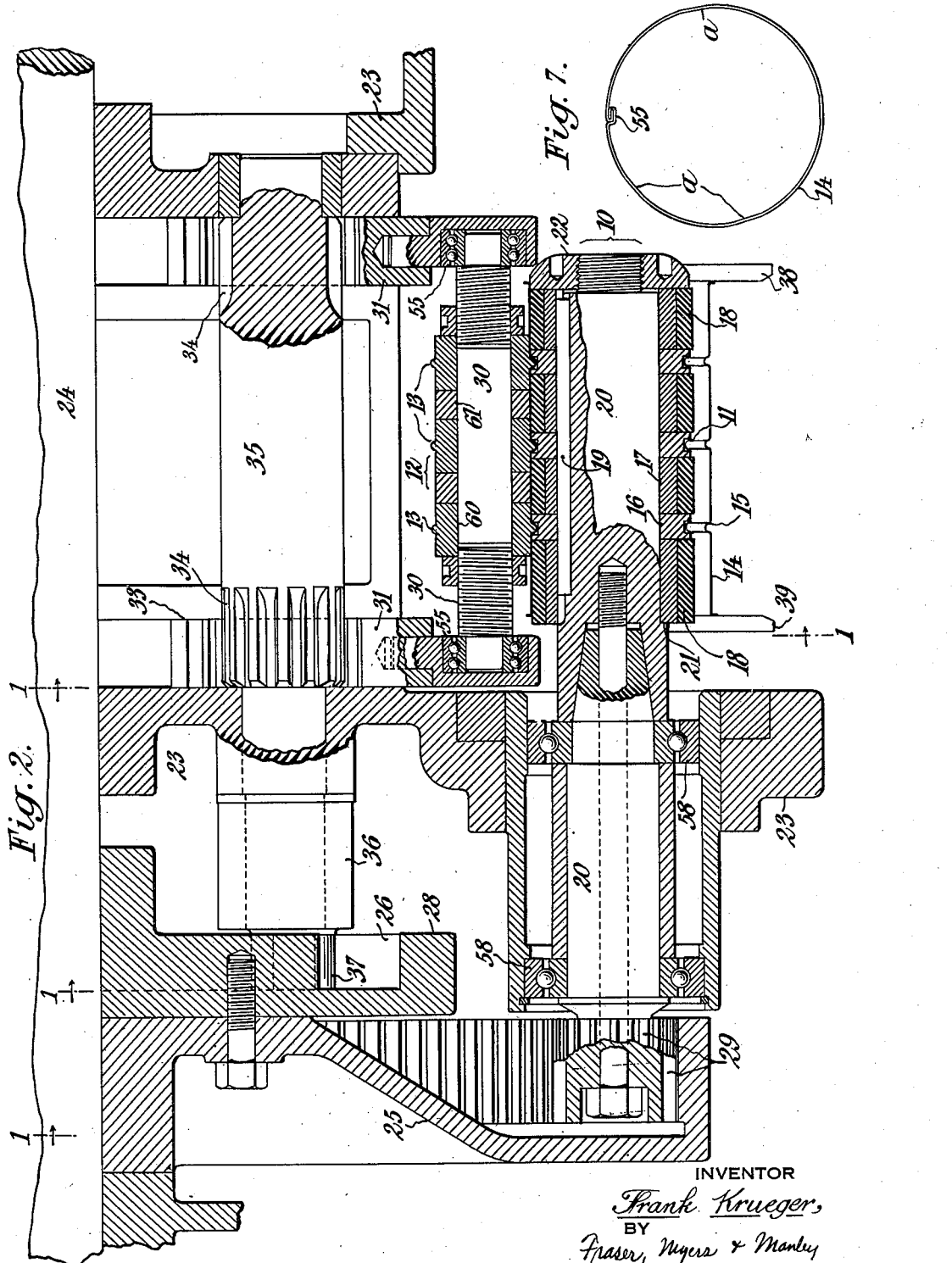

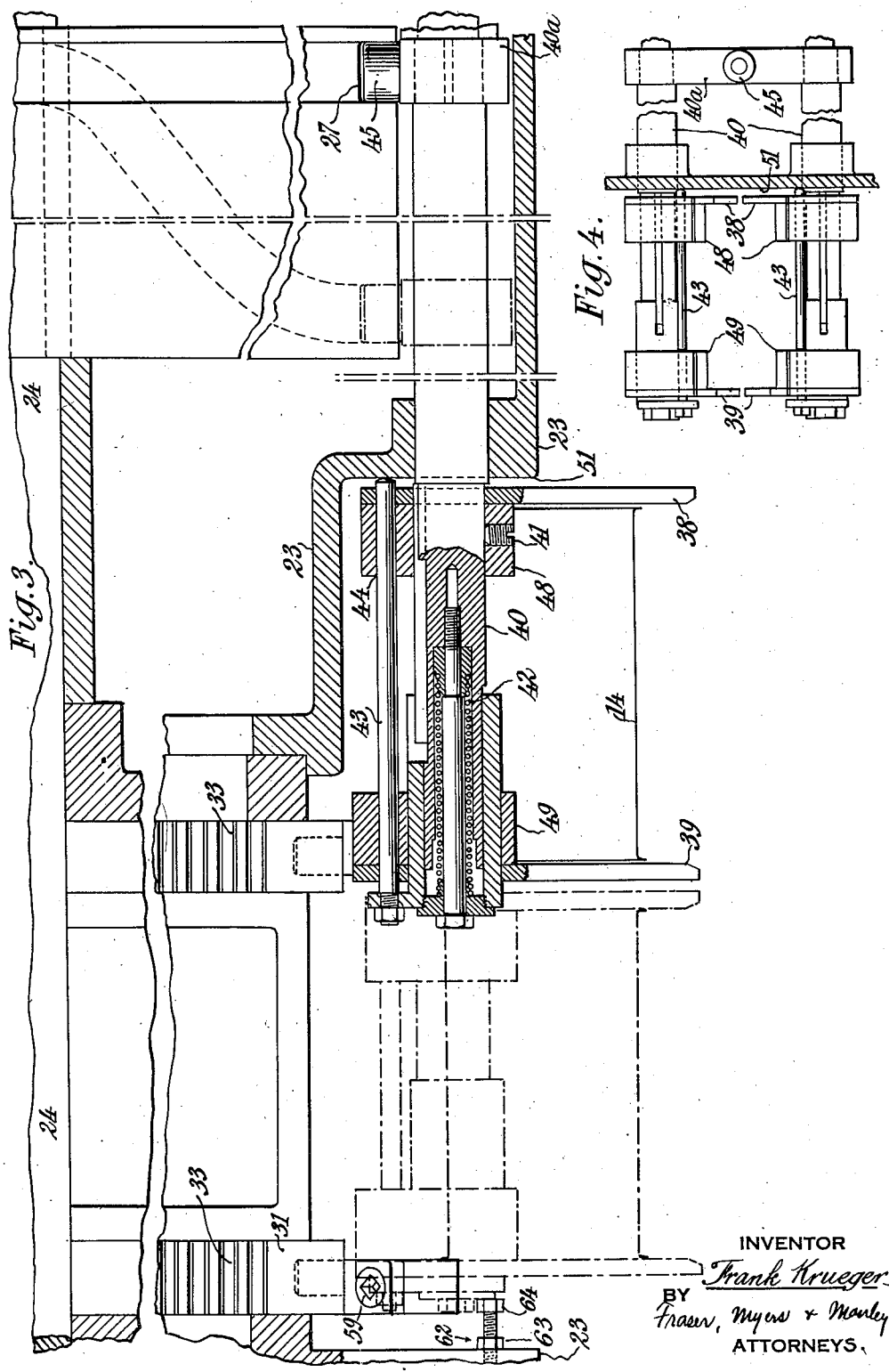

Patented May 18, 1937

2,081,042

UNITED STATES PATENT OFFICE 2,081,042

CAN BEADER

Frank Krueger, Brooklyn, N. Y., assignor to E. W. Bliss Company, New York, N. Y., a corporation of Delaware Application July 18, 1935, Serial No. 31,991

15 Claims. (Cl. 153—73)

This invention relates generally to the art of making can bodies, and more particularly to the formation of strengthening beads in such bodies.

During the past few years many innovations have been made in the canning industry. One of the most important of these, from the can maker's viewpoint, has been the rapid development of the art of packing materials under vacuum. Obviously, an evacuated can is subject to a constant external strain which tends to crush it, cause leaks, etc. Ordinary commercial can bodies are particularly subject to crushing because of the many flats and other surface irregularities which constitute points of weakness. However, even a perfectly formed body may not be sufficiently strong to withstand this constant strain. For the purpose of strengthening such cans it has been proposed to form one, or more, circumferential beads therein. My present invention aims to provide a machine which will form such circumferential beads at a very high speed; and which will at the same time smooth out the surface irregularities and produce a truly round can. Other objects and various features of the invention will be made more apparent from the following description to be read in connection with the accompanying drawings in which—

Figure 1 is a fragmentary end view of a machine embodying my invention, certain parts thereof being broken away better to show the interior construction.

Fig. 2 is a sectional view taken on the line 2—2 of Fig. 1.

Fig. 3 is a fragmentary sectional view of one of the can-carrying devices forming a part of the machine of Fig. 1.

Fig. 4 is a fragmentary plan view of part of the mechanism of Fig. 3.

Fig. 5 is another view of the can-carrying mechanism of Figs. 3 and 4, taken on lines 5—5 of Fig. 1.

Fig. 6 is a fragmentary plan view on an enlarged scale of a portion of the device of Fig. 1.

Fig. 7 is a diagrammatic representation of a partly formed can body.

In general, can bodies are formed by wrapping a sheet metal can blank about a forming horn, interlocking the overlapping edges, soldering the resulting seam, and thereafter flanging the ends of the body to receive a suitable top, all of which is done in a well known manner. Such can bodies tend to have surface irregularities therein, such as indicated at $a$ in Fig. 7. When a can of this general type is used for products which must be packed under vacuum, it is evident that these surface irregularities tend to form lines of weakness which may result in a crushing of the can. For the purpose of strengthening such a can, I propose to remove these "flats" and, further, to form a plurality of circumferential beads therein. The resulting can has been shown to have sufficient strength to withstand any strain to which it will normally be subjected. While these beads may be formed in any desired manner, I propose to roll them into the can, and to this end I provide an internal roll 10 having one or more circumferential beading dies 11 formed thereon; and an external roll 12 having corresponding beading dies 13 formed thereon, as shown in Fig. 2. These rolls are parallelly mounted and are movable both away from and towards each other. It is apparent that when the rolls are displaced from each other a can body 14 may be placed over the internal roll. Thereafter, when the rolls are brought together, the surface of the can will be squeezed therebetween, and by rotating the rolls, a plurality of beads 15 corresponding to the dies 11 and 13 will be rolled into the surface of the body.

Preferably, the surface of the internal roll 10, with the exception of the die portions, is of a deformable character; and further, the deformable portions of the rolls are of a greater diameter than are the non-deformable die portions. This composite structure may be made in any desired way, but as here shown it comprises a plurality of non-deformable die rings 16 spaced apart by non-deformable spacing rings 17, and a plurality of deformable rings 18 which are concentric to the spacing rings. As can be seen in the lower part of Fig. 2, the deformable rings 18 are of greater diameter than are the die rings 16. The rings 16, 17 and 18, are suitably keyed, as at 19, to a spindle 20; and they are held against longitudinal displacement between a shoulder 21 and a threaded end cap 22.

The external roll may be made in any desired manner and from any desired material. Preferably, however, it comprises a plurality of non-deformable die rings 60 and a plurality of non-deformable spacing rings 61 suitably mounted upon a spindle 30. These built-up rolls are particularly advantageous because the dies may be differently arranged to provide different numbers of beads; and further because worn parts may be easily replaced. When the rolls are brought together, it is evident that the external roll will indent the rings 18 to the extent of the difference in the diameters of these rings and the die rings 16. Thus, a can body which is positioned therebetween will likewise be indented; and as the rolls are rotated the body will be subjected to a wave bending action which tends to erase all flats and other surface irregularities as described in Patent No. 1,930,562.

The operation of the device is as follows. The rolls are separated, whereupon a can body is placed over the internal roll. The surfaces of the rolls are then brought substantially into contact, and the internal roll rotated in any desired manner, whereupon the die portions engage the can body and roll the bead therein, and the remaining portions of the two rolls flex and wave-bend the remaining part of the can body in accordance with the aforementioned patent, thereby working the material in such manner as to remove any surface irregularities.

It is evident that one unit comprising an internal and external roll would accomplish the beading and smoothing of the can. However, in order to perform this operation at substantially the same speed with which the cans are produced, I contemplate utilizing a number of these units in a single machine. As shown in Fig. 1, eight of these units are disposed about the periphery of a suitable frame 23, which frame is rotated in any desired manner about a stationary axle 24, the axle 24 preferably being disposed in a horizontal position. In fixed relation with the axle 24 is an internal ring gear 25, and two stationary cams 26 and 27 (Figs. 2 and 3). The cam 26 comprises a suitable groove in the face of a plate 28 which abuts and is fastened to the ring gear by means of suitable screws. Around the periphery of the ring gear, and in mesh therewith, are a plurality of planet pinions 29, these pinions being carried on the outer end of the spindles 20 of the internal rolls 10, the spindles being suitably journalled as at 58 in frame 23. The external rolls 12, preferably, are mounted in such fashion as to be movable away from and towards the internal rolls. Accordingly, each spindle 30 of each external roll 12, is journalled in two sliding rods 31, the sliding rods being mounted in suitable radial slots 32 of the frame 23. Each slide rod has a rack 33 formed thereon which meshes with a corresponding gear 34 formed on a shaft 35, the shaft 35 being journalled in the frame 23. The inner end of the shaft 35 carries a crank-block 36, to which a roller 37 is suitably fixed, the roller 37 being disposed within the cam groove 26 hereinbefore referred to. In operation, as the frame 23 rotates about the shaft 20, the stationary cam 26 will impart a reciprocatory motion to the roller 37 of the crank-block 36; and this motion will be transmitted through shaft 35 to the slide rods 31, thus moving the external roll 12 towards and away from the internal roll 10. Further, the rotary movement of the frame 23 with respect to the ring gear 25 results in a rotation of pinions 29, and hence, the internal rolls 10.

In order to feed can bodies to the rolls, each unit is provided with a carrier device comprising oppositely disposed guides 38 and 39 which are adapted to grasp the opposite ends of a can body 14. The outer guides 38 are fixedly attached to one or more sliding rods 40 by means of set screws 41, whereas the inner guides 39 are slidably attached to the rods 40 by means of a tension spring 42 which is disposed within the hollow end portion of the rod 40. A suitable pin 43, attached at one of its ends to the guide 39, extends through a hole 44 in the guide 38 and abuts against a ledge 51 of the frame 23. When in this position, the end guides 38 and 39 are separated to such an extent that a can body may be positioned therebetween. The rods 40, which are slidably mounted in the frame 23, extend out over the face of the stationary drum cam 27; and roller 45, which is carried on a bridge 40ᵃ connecting the rods, is disposed within the groove constituting this cam 27. When the carrier is in the full-line position of Fig. 3, the end guides 38 and 39 will be held open against the tension of spring 42 by pin 43. In this position, the star wheel 46 of a suitable well-known can feeder 47 deposits a can upon the carrier where it will be held between the concave abutments 48 and 49 of the guides 38 and 39, respectively, and a suitable spring-pressed plate 50. As the frame 23 rotates from the position A to position B (Fig. 1), the roller 45 will traverse the sinuous course of the cam 27, consequently forcing the rods 40 endwise towards the internal roll 10. As the carrier moves away from the ledge 51 of the frame 23, the pin 43 will be disengaged therefrom and, consequently, the spring 42 will move the end guide 39 towards the end guide 38, thus firmly grasping the ends of the can 14 therebetween. At the same time, both of these end guides and the can will be moved to the position indicated in dotted lines in Fig. 3, and in this position the can body 14 will be disposed over the internal roll 10.

At this point it may be recalled that one of the primary objects of the invention is to form beads on can bodies. The exact positioning, or accurate location, of such beads is usually a matter of considerable importance, and particularly so when the can is made from tin-plate on which a design has previously been lithographed. In this latter case it is usually desirable to have the beads register with a desired part of the printed design. This may be done by properly arranging the beading and spacing dies, and then holding a can body in a desired relationship thereto. With regard to the latter step, it is essential that the ends of the can shall be firmly gripped by the end guides 38 and 39 of the carrier in order to avoid "end play". This is primarily accomplished by means of the spring 42, which tends to pull the end guides together, thereby grasping the ends of the can. However, in order to insure a positive positioning of the can body with respect to the beading dies, I provide a registering stop, generally designated by the numeral 62 (Fig. 3), for each of the beading units. The stop may be made in any desired manner, but preferably it comprises a bolt 63 which is threaded into the frame 23 and locked in position by means of a suitable nut 64. In operation, as the can carrier approaches the dotted-line position of Fig. 3, the end of bolt 63 will engage the end guide 39 of the can carrier and force it toward end guide 38, thus insuring that the can will be firmly gripped and accurately positioned with respect to the beading dies. As soon as the can is in this position, the roller 37 will be acted upon by the cam 26 to force the external roll into contact with the internal roll. During the progress of the frame from the position B to position E, the ring gear will cause a rotation of the internal roll and a consequent smoothing and beading of the can body as hereinbefore described. As the frame approaches position F, the cam 26 acting on the roller 37 will retract the external roll 12; and as the frame moves from position F to position H, the cam 27 will cause a retraction of the end guides 38 and 39 from the dotted-line position of of Fig. 3 to the full-line position thereof, at which point the pin 43 will again engage the face 51 of the frame to displace the guide 39 from the guide 38, thus releasing the ends of the can body. Consequently, the can body will fall onto a suitable chute 52 and be carried away in any desired manner. The chute 52 and the stay plate 50 are adjustably mounted as at 53 and 54, respectively, to permit the machine to be used with can bodies of different sizes.

In order to accomplish the beading function of the machine, it is apparent that the non-deformable die rings 16 of the roll 10 must be brought substantially into contact with the non-deformable surface of roll 12. However, in order to accommodate the thickened seam portion 55 of the can body 14, the rolls must be so mounted as to have a certain amount of play. Accordingly, the recess 56, in which the race 57 of the spindle 30 is held, is enlarged preferably along an axis X—X at an angle to the center line of the rods 31 (Fig. 6). The race is suitably backed up along the axis by means of a spring 58, which is held in compression by a cap screw 59. When the thickened portion 55 of the can approaches the line of contact between the rolls, the external roll 12 will move away from the internal roll 10, thereby to accommodate the can seam. Thus, the rolls 10 and 12 are self-adjusting to care for the varying thickness of any given can body.

Since certain changes may be made in the construction without in any way departing from the scope of the invention, it is intended that the embodiments therein shown and described shall be construed in an illustrative rather than in a limiting sense.

What I claim is:

1. A machine for treating can bodies comprising internal and external rolls which are adapted to receive an open-ended can body therebetween, said rolls having circumferential beading dies formed thereon, and means for rotating said rolls whereby the can body may be rolled therebetween, said machine being further characterized in that the internal roll comprises alternate rings of deformable and non-deformable material, the non-deformable rings having beading dies formed thereon, and the deformable rings being of greater diameter than the non-deformable rings.

2. A machine for treating can bodies comprising an internal roll having circumferential beading dies formed thereon, means for positively rotating said internal roll, a pair of spaced slide rods having racks formed thereon, an external roll having circumferential beading dies formed thereon which are complemental to the dies on the internal roll and having its opposite ends journaled in said spaced slide rods, a pair of gears in mesh with the racks on said slide rods, and means for rotating said gears whereby the slide rods and the external roll carried thereby may be moved with respect to the internal roll.

3. A machine for treating can bodies comprising parallelly mounted internal and external rolls, said rolls having circumferential beading dies formed thereon, means for positioning a can body over the internal roll, means for moving said external roll towards said internal roll whereby the can body may be squeezed therebetween, means for rotating said rolls whereby a bead may be rolled onto said can body, said external roll being self adjusting with respect to said internal roll to accommodate the thickened seam portion of the can body.

4. A machine for treating can bodies comprising internal and external rolls one of which is movable both towards and away from the other, a pair of slide rods for supporting the opposite ends of the movable roll, each of said rods having a recessed portion for accommodating an end of said roll, said recessed portion being elongated whereby the roll may have a limited movement with respect to said rods.

5. A machine according to claim 4 in which the ends of the movable roll are provided with bearings, and springs for backing up said bearings along the line of elongation of said recessed portions.

6. A machine according to claim 4 in which the recessed portions are elongated along an axis which is at an angle to the center line of said rods.

7. A machine for treating can bodies comprising parallelly mounted internal and external rolls having corresponding circumferential beading dies formed thereon, means for moving said external roll away from said internal roll whereby an open-ended can body may be positioned over the internal roll and for moving the external roll towards said internal roll whereby to grasp said can body therebetween, means for positively rotating said inner roll whereby a circumferential bead will be rolled into said body, said machine being further characterized in that one of the rolls is radially deformable along a portion of its extent and the other roll is non-deformable at corresponding points whereby the non-deformable roll will indent the deformable portions of the other roll and a can body positioned therebetween when the rolls are brought together.

8. A machine according to claim 7, which is further characterized in that the internal roll comprises alternate rings of deformable and non-deformable material, the non-deformable rings having beading dies formed thereon, and the deformable rings being of greater diameter than the non-deformable rings, and the external roll is non-deformable throughout its length whereby it will indent the deformable portions of the internal roll and a can body positioned therebetween when the rolls are brought together.

9. A machine for treating can bodies comprising an internal roll, means for positively rotating said internal roll, an external roll, a pair of slide rods for supporting the opposite ends of the external roll, means for reciprocating said slide rods whereby the external roll may be moved towards and away from the internal roll, each of said slide rods having a recessed portion for accommodating the journals of said external roll, said recessed portions being elongated whereby the roll may have a limited movement with respect to said slide rods.

10. A machine for treating can bodies comprising internal and external rolls, one of which is movable both towards and away from the other, a pair of slide rods for supporting the opposite ends of said movable roll, each of said rods having a recessed portion for accommodating the journaled portion of said movable roll, said recessed portion being elongated along an axis which is at an angle to the center line of each of said rods whereby the roll may have a limited movement with respect to said rods, and springs for backing up said journaled portions of said movable roll along the line of elongation of said recessed portion.

11. A machine for treating can bodies comprising parallelly mounted internal and external rolls having complemental circumferential beading dies formed thereon, said rolls being movable away from each other whereby a can body may be positioned over the internal roll and towards each other to squeeze the can body therebetween, and means for rotating said rolls, said machine being further characterized in that one of the rolls is radially deformable along a portion of its extent and the other roll is non-deformable at corresponding points whereby the non-deformable roll will indent the deformable portions of the other roll and the can body positioned therebetween when the rolls are brought together.

12. A machine for treating can bodies comprising a plurality of units each consisting of an internal and an external roll having corresponding circumferential beading dies formed thereon, means for moving the rolls of each unit towards and away from each other, a carrier associated with each unit, said carrier comprising guides which are adapted to grip the ends of a can body, means for moving said carrier towards and away from said rolls in a direction parallel to the axis of said rolls, whereby the can body may be positioned between said rolls, and means for rotating said rolls whereby circumferential beads may be rolled into said body.

13. A machine for treating can bodies comprising a plurality of units each including an internal and an external roll having complemental circumferential beading dies formed thereon, means for moving one of the rolls both away from and towards the other roll, a can body carrier associated with each unit comprising a slide rod, a pair of end guides mounted upon said slide rod for gripping the opposite ends of the can body and a cam for reciprocating said slide rod whereby to displace a can body endwise over one of said rolls, and means for locating the can body with respect to the beading dies comprising an adjustable stop element against which one of the end guides abuts when the carrier is in a desired position with respect to said rolls.

14. A machine according to claim 13 in which the carrier comprises a pair of end guides for gripping the opposite ends of a can body mounted upon a slide rod, one of said guides being slidably fastened to the rod and the other being stationarily fastened thereto, and a spring for drawing the slidable guide towards the stationary one, whereby to grip the opposite ends of a can body; and the means for locating the can body with respect to the beading dies comprises an adjustable stop against which the slidable guide abuts when the can is in a desired position with respect to the beading dies.

15. A machine for treating can bodies comprising a plurality of units, each including an internal and an external roll having corresponding circumferential beading dies formed thereon, means for rotating the internal roll of each unit, means for moving one of the rolls of each unit both towards and away from the other roll, a can body carrier associated with each unit, said carrier comprising end guides which are adapted to grasp the opposite ends of a can body, means for moving said carrier towards and away from the rolls in a direction parallel to the axes thereof whereby to position a can body between said rolls and subsequently to withdraw the body therefrom, and means for stopping the movement of the carrier towards the roll at a predetermined point whereby the can body carried thereby may be accurately positioned with respect to the beading dies on said rolls.

FRANK KRUEGER.